US011107073B2

(12) United States Patent
Yin

(10) Patent No.: US 11,107,073 B2
(45) Date of Patent: *Aug. 31, 2021

(54) METHOD AND DEVICE FOR LINKING TO ACCOUNT AND PROVIDING SERVICE PROCESS

(71) Applicant: Advanced New Technologies Co., Ltd., George Town (KY)

(72) Inventor: Jun Yin, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/722,209

(22) Filed: Dec. 20, 2019

(65) Prior Publication Data
US 2020/0151789 A1 May 14, 2020

Related U.S. Application Data

(63) Continuation of application No. 16/132,050, filed on Sep. 14, 2018, which is a continuation of application No. PCT/CN2017/075519, filed on Mar. 3, 2017.

(51) Int. Cl.
*G06Q 20/38* (2012.01)
*G06Q 30/06* (2012.01)
(Continued)

(52) U.S. Cl.
CPC ....... *G06Q 20/38215* (2013.01); *G06Q 20/10* (2013.01); *G06Q 20/3221* (2013.01);
(Continued)

(58) Field of Classification Search
None
See application file for complete search history.

(56) References Cited

U.S. PATENT DOCUMENTS 6,327,578 B1 * 12/2001 Linehan ............. G06Q 20/02
705/65
7,376,621 B1 * 5/2008 Ling ................... G06Q 20/04
705/30
(Continued)

FOREIGN PATENT DOCUMENTS

CN 101291221 10/2008
CN 101414370 4/2009
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jacob C. Coppola
(74) *Attorney, Agent, or Firm* — Fish & Richardson P.C.

(57) ABSTRACT

Implementations of the present application provide methods and devices for linking to an account and providing service processing. In one example method, an uncertified server can receive a linking request sent by a terminal device, wherein the linking request corresponds to a user account logged in by a user to the uncertified server. The uncertified service can transmit, to the terminal device, a predetermined instruction based on the linking request, wherein the predetermined instruction instructs the terminal device to send a real service account request to a certified server based on predetermined instruction. The uncertified server can later receive, from the terminal device, a virtual service account identifier generated by the certified server in response to the real service account request sent by the terminal device to the certified server. The virtual service account identifier can then be linked to the user account and used at a later time to transmit service requests along with the virtual service (Continued)

account identifier without sharing the real service account information.

11 Claims, 14 Drawing Sheets

(51) Int. Cl.
*G06Q 20/10* (2012.01)
*G06Q 20/34* (2012.01)
*G06Q 20/32* (2012.01)
*H04L 29/06* (2006.01)

(52) U.S. Cl.
CPC ......... *G06Q 20/351* (2013.01); *G06Q 20/385* (2013.01); *G06Q 30/0601* (2013.01); *G06Q 30/0609* (2013.01); *H04L 63/0823* (2013.01); *G06Q 20/356* (2013.01); *H04L 29/06* (2013.01)

(56) References Cited

U.S. PATENT DOCUMENTS

| | | | | |
|---|---|---|---|---|
| 9,092,777 | B1* | 7/2015 | Gaspar | G06Q 20/385 |
| 10,535,065 | B2* | 1/2020 | Muftic | G06Q 20/20 |
| 10,911,429 | B2* | 2/2021 | Law | H04L 9/3268 |
| 2002/0111907 | A1* | 8/2002 | Ling | G06Q 20/29 705/41 |
| 2004/0139008 | A1* | 7/2004 | Mascavage, III | G06Q 20/14 705/40 |
| 2006/0235761 | A1* | 10/2006 | Johnson | G06Q 20/02 705/26.1 |
| 2009/0292619 | A1* | 11/2009 | Kagan | G06Q 20/102 705/26.1 |
| 2011/0258122 | A1* | 10/2011 | Shader | G06Q 20/20 705/67 |
| 2012/0209749 | A1* | 8/2012 | Hammad | G06Q 20/20 705/27.1 |
| 2015/0161596 | A1* | 6/2015 | McCarthy | G06Q 20/204 705/67 |
| 2015/0186875 | A1 | 7/2015 | Zhang et al. | |
| 2015/0332264 | A1 | 11/2015 | Bondesen et al. | |
| 2016/0239833 | A1* | 8/2016 | Venugopalan | G06Q 20/20 |
| 2017/0091757 | A1* | 3/2017 | Lloyd | G06Q 20/227 |
| 2017/0109540 | A1* | 4/2017 | Heiman | G06Q 20/38215 |
| 2019/0026804 | A1 | 1/2019 | Yin | |

FOREIGN PATENT DOCUMENTS

| | | | |
|---|---|---|---|
| CN | 102364516 | 2/2012 | |
| CN | 103188238 | 7/2013 | |
| CN | 104616147 | 5/2015 | |
| CN | 104660485 | 5/2015 | |
| CN | 104700267 | 6/2015 | |
| EP | 1028401 | 8/2000 | |
| EP | 1028401 A2 * | 8/2000 | ........... G06Q 20/385 |
| JP | 2000322486 | 11/2000 | |
| JP | 2002298055 | 10/2002 | |
| JP | 2004343440 | 12/2004 | |
| JP | 2013015881 | 1/2013 | |
| JP | 2015194796 | 11/2015 | |
| WO | WO 2010003079 | 1/2010 | |
| WO | WO-2010064128 A2 * | 6/2010 | ............ H04W 12/06 |
| WO | WO-2014124485 A1 * | 8/2014 | ............. G06Q 20/20 |
| WO | WO-2015004625 A1 * | 1/2015 | ........... G06Q 20/385 |
| WO | WO 2015102122 | 7/2015 | |

OTHER PUBLICATIONS

Extended European Search Report in European Application No. 17765727.7, dated Aug. 9, 2019, 9 pages.
International Search Report by the International Searching Authority issued in International Application No. PCT/CN2017/075519 dated Jun. 7, 2017; 10 pages.
Nakamoto, "Bitcoin: A Peer-to-Peer Electronic Cash System," www.bitcoin.org, 2005, 9 pages.
Wikipedia.org [online], "Tokenization (data security)," Dec. 2014, retrieved on Aug. 9, 2019, retrieved from URL<https://en.wikipedia.org/wiki/Tokenization_(data_security)>, 6 pages.
PCT International Preliminary Report on Patentability in International Application No. PCT/CN2017/075519, dated Sep. 18, 2018, 8 pages (with English translation).
ntu.edu [online], "An Introduction to HTTP Bascis," Available on or begore May 13, 2012, via Internet Archive: Wayback Machine URL<https://web.archive.org/web/20120513121251/https://www3.ntu.edu.sg/home/ehchua/programming/webprogramming/HTTP_Basics.html>, retrieved on Dec. 1, 2020, 21 pages.

* cited by examiner

METHOD AND DEVICE FOR LINKING TO ACCOUNT AND PROVIDING SERVICE PROCESS

This application is a continuation of U.S. patent application Ser. No. 16/132,050, filed on Sep. 14, 2018, which is a continuation of PCT Application No. PCT/CN2017/075519, filed on Mar. 3, 2017, which claims priority to Chinese Patent Application No. 201610150066.8, filed on Mar. 16, 2016, and each application is hereby incorporated by reference in its entirety.

TECHNICAL FIELD

The present application relates to the field of computer technologies, and in particular, to methods and devices for linking to an account and providing service processing.

BACKGROUND

Rapid development of network technologies is accompanied with increasingly comprehensive services and functions provided by servers on network platforms. Currently, the servers have integrated most offline services to provide them online, so users can process a plurality of services online, bringing convenience to their daily life.

The servers successively provide a service linking function for users so that the users can quickly complete processing of various services on the servers. In other words, on the servers, the users are allowed to link service accounts used for service processing with user accounts logged in to the servers. As such, when the users process the same service in the future, they do not need to repeatedly enter the service accounts used for service processing, thereby reducing the complexity of service processing and bringing convenience to the users.

However, the servers on the network platforms generally need to have certain operation qualifications in order to operate some specific services. To be specific, some specific services have high user information security requirements; therefore, a specific audit department needs to perform a security check on systems, hardware and such of the servers, and the servers can operate these specific services only after being approved. For the servers to succeed in the security check of the audit department, maintenance personnel of the servers usually need to perform a large amount of security reconstruction on the systems, the hardware of the servers, and invest high operation expenses. Operating the specific services usually increases operation costs, and therefore some network platforms do not perform security reconstruction on the systems, the hardware of the servers on the network platforms due to operation cost pressure. Consequently, the servers on the network platforms do not comply with standards for operating the specific services and cannot operate the specific services. As a result, each time users process services in the servers that do not have the qualifications for operating the specific services, the servers need to redirect service processing interfaces to interfaces on servers that have the service processing qualifications. In other words, users' service requests are forwarded to the servers that have the qualifications for operating the specific services. Further, the users need to enter the service accounts used for service processing on the interfaces displayed by the servers that have the operation qualifications, to process the services. Therefore, the complexity of service processing for the users is increased and service processing convenience of the users is reduced.

SUMMARY

Implementations of the present application provide a method and a device for linking to an account and providing service processing, to resolve a problem in the existing technology that service processing performed by an uncertified server increases the complexity of user operation and reduces service processing convenience.

An implementation of the present application provides a method for linking to an account, including: an uncertified server receives a linking request sent by a terminal device, where the linking request corresponds to a user account logged in by a user to the uncertified server; returns a predetermined instruction to the terminal device based on the linking request, so the terminal device sends a real service account to a certified server based on the predetermined instruction, and further the certified server generates a virtual service account corresponding to the real service account and returns the virtual service account to the terminal device; receives the virtual service account sent by the terminal device; and links the virtual service account to the user account.

An implementation of the present application provides a method for linking to an account, including: a certified server receives a real service account sent by a terminal device, where the real service account is sent by the terminal device to the certified server based on a predetermined instruction that is sent by an uncertified server to the terminal device, the predetermined instruction is returned by the uncertified server to the terminal device after receiving a linking request sent by the terminal device, and the linking request corresponds to a user account logged in by a user to the uncertified server; generates a virtual service account corresponding to the real service account; and returns the virtual service account to the terminal device, so the terminal device sends the virtual service account to the uncertified server after receiving the virtual service account, and further the uncertified server links the virtual service account to the user account.

An implementation of the present application provides a method for providing service processing, including: an uncertified server receives a service request sent by a terminal device, where the service request corresponds to a user account logged in by a user to the uncertified server; determines, based on the service request, a virtual service account linked to the user account; and sends the virtual service account and the service request to a certified server, so the certified server determines a pre-stored real service account corresponding to the virtual service account based on the virtual service account, and further the certified server performs service processing based on the real service account and the service request.

An implementation of the present application provides a method for providing service processing, including: a certified server receives a virtual service account and a service request that are sent by an uncertified server, where the service request is sent by a terminal device to the uncertified server, the service request corresponds to a user account logged in by a user to the uncertified server, and the virtual service account is a virtual service account that is linked to the user account and that is determined by the uncertified server based on the service request; determines a real service account corresponding to the virtual service account based on the virtual service account; and performs service processing based on the real service account and the service request.

An implementation of the present application provides a method for linking to an account, including: a merchant system receives a linking request sent by a terminal device, where the linking request corresponds to a user account logged in by a user to the merchant system; returns a predetermined instruction to the terminal device based on the linking request, so the terminal device sends a real bank card number to a payment system based on the predetermined instruction, and further the payment system generates a virtual bank card number corresponding to the real bank card number and returns the virtual bank card number to the terminal device; receives the virtual bank card number sent by the terminal device; and links the virtual bank card number to the user account.

An implementation of the present application provides a method for linking to an account, including: a payment system receives a real bank card number sent by a terminal device, where the real bank card number is sent by the terminal device to the payment system based on a predetermined instruction that is sent by a merchant system to the terminal device, the predetermined instruction is returned by the merchant system to the terminal device after receiving a linking request sent by the terminal device, and the linking request corresponds to a user account logged in by a user to the merchant system; generates a virtual bank card number corresponding to the real bank card number; and returns the virtual bank card number to the terminal device, so the terminal device sends the virtual bank card number to the merchant system after receiving the virtual bank card number, and further the merchant system links the virtual bank card number to the user account.

An implementation of the present application provides a method for providing service processing, including: a merchant system receives a service request sent by a terminal device, where the service request corresponds to a user account logged in by a user to the merchant system; determines, based on the service request, a virtual bank card number linked to the user account; and sends the virtual bank card number and the service request to a payment system, so the payment system determines a pre-stored real bank card number corresponding to the virtual bank card number based on the virtual bank card number, and further the payment system performs service processing based on the real bank card number and the service request.

An implementation of the present application provides a method for providing service processing, including: a payment system receives a virtual bank card number and a service request that are sent by a merchant system, where the service request is sent by a terminal device to the merchant system, the service request corresponds to a user account logged in by a user to the merchant system, and the virtual bank card number is a virtual bank card number that is linked to the user account and that is determined by the merchant system based on the service request; determines a real bank card number corresponding to the virtual bank card number based on the virtual bank card number; and performs service processing based on the real bank card number and the service request.

An implementation of the present application provides a device for linking to an account, including: a request receiving module, configured to receive a linking request sent by a terminal device, where the linking request corresponds to a user account logged in by a user to the device; a returning module, configured to return a predetermined instruction to the terminal device based on the linking request, so the terminal device sends a real service account to a certified server based on the predetermined instruction, and further the certified server generates a virtual service account corresponding to the real service account and returns the virtual service account to the terminal device; an account receiving module, configured to receive the virtual service account sent by the terminal device; and a linking module, configured to link the virtual service account to the user account.

An implementation of the present application provides a device for linking to an account, including: a receiving module, configured to receive a real service account sent by a terminal device, where the real service account is sent by the terminal device to the device based on a predetermined instruction that is sent by an uncertified server to the terminal device, the predetermined instruction is returned by the uncertified server to the terminal device after receiving a linking request sent by the terminal device, and the linking request corresponds to a user account logged in by a user to the uncertified server; a generation module, configured to generate a virtual service account corresponding to the real service account; and a returning module, configured to return the virtual service account to the terminal device, so the terminal device sends the virtual service account to the uncertified server after receiving the virtual service account, and further the uncertified server links the virtual service account to the user account.

An implementation of the present application provides a device for providing service processing, including: a receiving module, configured to receive a service request sent by a terminal device, where the service request corresponds to a user account logged in by a user to the device; a determining module, configured to determine, based on the service request, a virtual service account linked to the user account; and a sending module, configured to send the virtual service account and the service request to a certified server, so the certified server determines a pre-stored real service account corresponding to the virtual service account based on the virtual service account, and further the certified server performs service processing based on the real service account and the service request.

An implementation of the present application provides a device for providing service processing, including: a receiving module, configured to receive a virtual service account and a service request that are sent by an uncertified server, where the service request is sent by a terminal device to the uncertified server, the service request corresponds to a user account logged in by a user to the uncertified server, and the virtual service account is a virtual service account that is linked to the user account and that is determined by the uncertified server based on the service request; a determining module, configured to determine a real service account corresponding to the virtual service account based on the virtual service account; and a processing module, configured to perform service processing based on the real service account and the service request.

An implementation of the present application provides a device for linking to an account, including: a request receiving module, configured to receive a linking request sent by a terminal device, where the linking request corresponds to a user account logged in by a user to the device; an instruction returning module, configured to return a predetermined instruction to the terminal device based on the linking request, so the terminal device sends a real bank card number to a payment system based on the predetermined instruction, and further the payment system generates a virtual bank card number corresponding to the real bank card number and returns the virtual bank card number to the terminal device; a card number receiving module, configured to receive the virtual bank card number sent by the terminal device; and a linking module, configured to link the virtual bank card number to the user account.

An implementation of the present application provides a device for linking to an account, including: a card number receiving module, configured to receive a real bank card number sent by a terminal device, where the real bank card number is sent by the terminal device to the device based on a predetermined instruction that is sent by a merchant system to the terminal device, the predetermined instruction is returned by the merchant system to the terminal device after receiving a linking request sent by the terminal device, and the linking request corresponds to a user account logged in by a user to the merchant system; a card number generation module, configured to generate a virtual bank card number corresponding to the real bank card number; and a card number returning module, configured to return the virtual bank card number to the terminal device, so the terminal device sends the virtual bank card number to the merchant system after receiving the virtual bank card number, and further the merchant system links the virtual bank card number to the user account.

An implementation of the present application provides a device for providing service processing, including: a request receiving module, configured to receive a service request sent by a terminal device, where the service request corresponds to a user account logged in by a user to the device; a card number determining module, configured to determine, based on the service request, a virtual bank card number linked to the user account; and a sending module, configured to send the virtual bank card number and the service request to a payment system, so the payment system determines a pre-stored real bank card number corresponding to the virtual bank card number based on the virtual bank card number, and further the payment system performs service processing based on the real bank card number and the service request.

An implementation of the present application provides a device for providing service processing, including: a receiving module, configured to receive a virtual bank card number and a service request that are sent by a merchant system, where the service request is sent by a terminal device to the merchant system, the service request corresponds to a user account logged in by a user to the merchant system, and the virtual bank card number is a virtual bank card number that is linked to the user account and that is determined by the merchant system based on the service request; a card number determining module, configured to determine a real bank card number corresponding to the virtual bank card number based on the virtual bank card number; and a processing module, configured to perform service processing based on the real bank card number and the service request.

Implementations of the present application provide a method and a device for linking to an account and providing service processing. In the method, after receiving a linking request sent by a user terminal device, an uncertified server can return to the terminal device a predetermined instruction that enables the terminal device to access a certified server. Based on the predetermined instruction, the terminal device can send a real service account of a user used for service processing, so the certified server can generate a virtual service account corresponding to the real service account, and return the virtual service account to the user terminal device. After receiving the virtual service account sent by the user terminal device, the uncertified server can link the virtual service account to a user account that is registered by the user with the uncertified server. It can be seen from the previously described method that, the uncertified server links the virtual service account to the user account. As such, after receiving a service request from the user subsequently, the uncertified server can call the virtual service account based on the linking relationship and send the virtual service account to the certified server, and further the certified server can use the real service account to eventually complete service processing based on a mapping relationship between the virtual service account and the real service account. In other words, the certified server that has a qualification for operating a specific service can output a service processing capability to the uncertified server that does not have the qualification for operating the specific service. Therefore, when performing service processing on the uncertified server, the user does not need to enter the real service account used for service processing each time, thereby reducing the complexity of service processing for the user and bringing convenience to the user during service processing.

BRIEF DESCRIPTION OF DRAWINGS

Drawings here constitute a part of the present application and are used to provide a further understanding of the present application, and schematic implementations of the present application and descriptions of the implementations are used to explain the present application, which do not constitute an improper limitation to the present application. In the drawings.

DESCRIPTION OF IMPLEMENTATIONS

To make the objectives, technical solutions, and advantages of the present application clearer, the following clearly and completely describes the technical solutions of the present application with reference to the implementations of the present application and the corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

Figure 1:
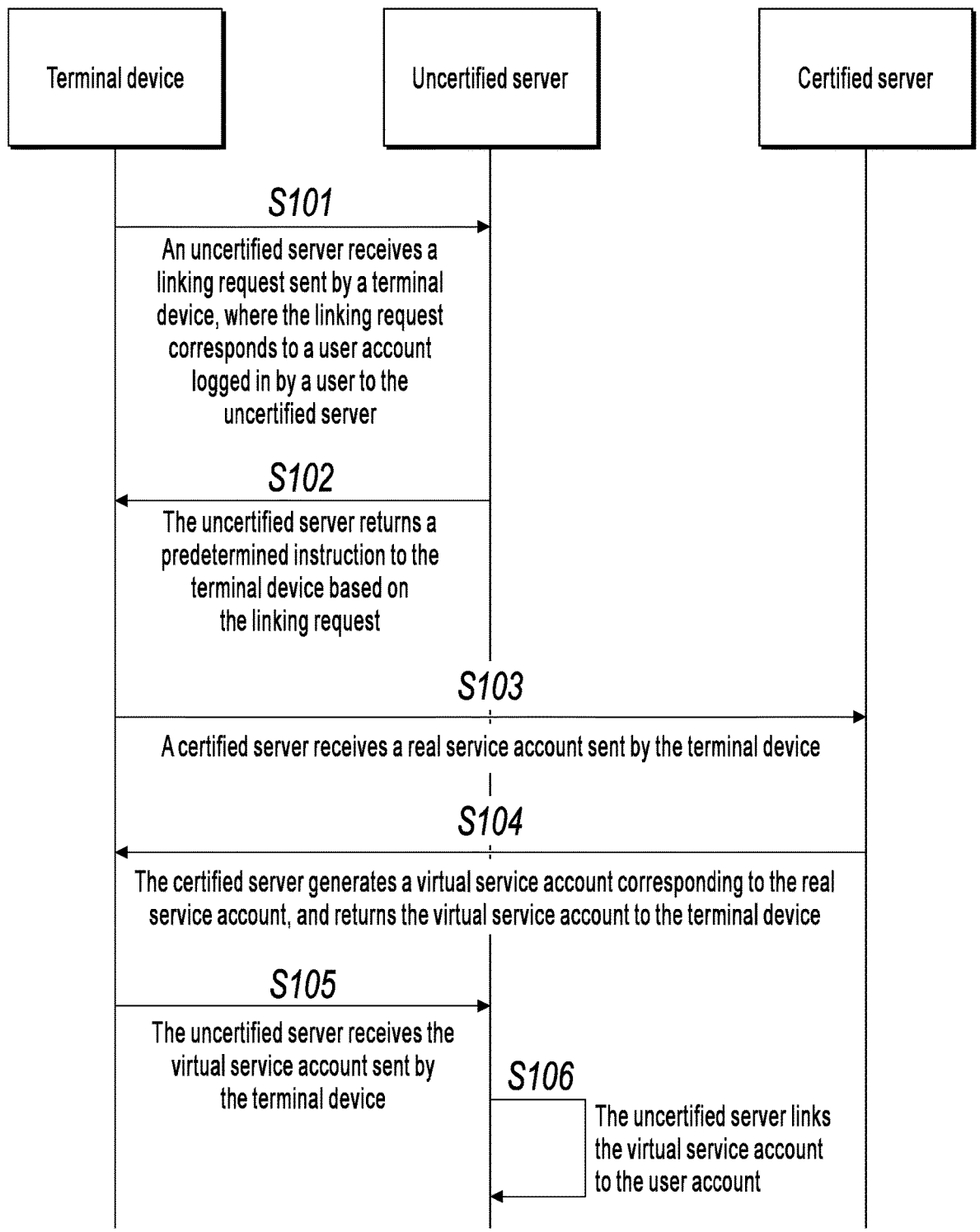
FIG. 1 illustrates an account linking process, according to an implementation of the present application.

FIG. 1 illustrates an account linking process, according to an implementation of the present application. The account linking process includes the following steps.

S101: An uncertified server receives a linking request sent by a terminal device, where the linking request corresponds to a user account logged in by a user to the uncertified server.

In real life, a user usually needs to process a specific service such as air ticket purchase, verification code acquisition by using a mobile phone, or payment by using a credit card. However, in actual applications, not all servers have a qualification for operating the specific service. Therefore, a server that does not have the qualification for operating the specific service, namely, the uncertified server, cannot provide the user with an account linking function for the specific service. Consequently, it is inconvenient to the user during a service processing process.

To reduce the problem above, in this implementation of the present application, the uncertified server that does not have the qualification for operating the specific service can be made to provide the account linking function for the specific service, so the user can quickly complete service processing work subsequently. Therefore, when the user needs to perform account linking on the uncertified server for a specific service, the user can first log in to the uncertified server by using the terminal device and the user account that is registered with the uncertified server in advance, and then sends a linking request to the uncertified server. The uncertified server correspondingly receives the linking request that corresponds to the user account and that is sent by the terminal device, and completes linking to the user account through subsequent steps S102 to S106.

S102: The uncertified server returns a predetermined instruction to the terminal device based on the linking request.

After receiving the linking request sent by the user terminal device, the uncertified server can first sign a pre-stored license certificate of a certified server, to obtain a signed license certificate, and further return the predetermined instruction including the signed license certificate to the user terminal device. In subsequent step S103, the user terminal device can access the certified server based on the predetermined instruction.

Because the uncertified server does not have the qualification for operating the specific service, the uncertified server cannot store a real service account of the user used for service processing. For the uncertified server to provide the user with the account linking function for the specific service, the certified server (namely, the server that has the qualification for operating the specific service) needs to assist the uncertified server in completing account linking work for the specific service. Therefore, after receiving the linking request sent by the terminal device, the uncertified server can return the predetermined instruction to the terminal device based on the linking request. The predetermined instruction includes the signed license certificate that is obtained after the uncertified server signs the pre-stored license certificate of the certified server. The license certificate is a license certificate authorized by the certified server to the uncertified server before the uncertified server provides the user with the account linking function. In other words, the certified server authorizes the uncertified server to perform service interaction with the certified server. As such, in actual applications, some law breakers usually maliciously access the certified server. To effectively reduce such cases, the certified server generally first sends a license certificate to the uncertified server that is allowed to perform service interaction with the certified server. As such, when the uncertified server performs service interaction with the certified server subsequently, the certified server can determine whether access here by the terminal device to the certified server is valid based on the signed license certificate that is sent by the terminal device and that is obtained after the uncertified server signs the license certificate. Therefore, the uncertified server can first sign the pre-stored license certificate of the certified server after receiving the linking request sent by the terminal device, and further return the predetermined instruction including the signed license certificate to the user terminal device. As such, after receiving the predetermined instruction, the terminal device can access the certified server successfully in subsequent step S103. In addition to the previously described signed license certificate, the predetermined instruction returned by the uncertified server to the terminal device can further include a port number, some call instructions, etc. of the certified server, so the terminal device can complete the access to the certified server and various operations in a subsequent process based on the port number and call instructions.

S103: A certified server receives a real service account sent by the terminal device.

In actual applications, the user generally completes service processing based on a real service account corresponding to the services. In general cases, the real service account can be stored only in the certified server that has the qualification for operating the specific service. Therefore, in this implementation of the present application, to assist the uncertified server in completing accounting linking of the user for the specific service, the certified server needs to receive the real service account sent by the user terminal device. In addition, the certified server further needs to receive the signed license certificate sent by the user terminal device. A reason for such practice is as follows: In actual applications, the certified server stores a large amount of security information of the user, and therefore the certified server needs to perform security detection for access performed by the terminal device each time, to reduce stealing of stored user information caused by malicious access by malicious users to the certified server. Therefore, in this implementation of the present application, after receiving the real service account sent by the terminal device, the certified server does not immediately generate a virtual service account based on the real service account, but needs to determine whether access by the terminal device this time is valid, in other words, whether the access by the terminal device this time is performed based on the uncertified server that coordinates with the certified server. Therefore, the certified server further needs to receive the signed license certificate sent by the terminal device. The signed license certificate is obtained after the uncertified server signs the pre-stored license certificate of the certified server. Afterwards, the certified server can perform verification on the signed license certificate sent by the terminal device after receiving the signed license certificate, to be specific, verifying whether the signed license certificate is obtained after the uncertified server coordinating with the certified server signs the license certificate authorized by the certified server; and when determining that the verification succeeds, generates a unique virtual service account corresponding to the real service account sent by the terminal device. After correspondingly receiving the virtual service account generated from the real service account, the certified server can return the virtual service account to the user terminal device, so the terminal device can send the virtual service account to the uncertified server and further the uncertified server can link the virtual service account to the user account that is registered by the user with the uncertified server. As such, when the user performs service processing on the uncertified server in the future, the user can quickly complete the service processing work based on the virtual service account previously linked on the uncertified server.

It is worthwhile to note that, in consideration of importance of the real service account, the terminal device can use an encryption method to send the real service account to the certified server, for example, use the Hyper Text Transfer Protocol over Secure Socket Layer (HTTPS) to send the real service account of the user.

S104: The certified server generates a virtual service account corresponding to the real service account, and returns the virtual service account to the terminal device.

After receiving the real service account sent by the terminal device, the certified server can generate the unique virtual service account corresponding to the real service account. A virtual service account corresponds to the real service account and the virtual service account generated by the certified server is different each time. The purpose of above step is that in actual applications, it is possible that law breakers maliciously attempt to perform account linking to steal the real service account of the user.

For example, assume that user A sends real service account A used for service processing to a certified server and the certified server returns virtual service account A corresponding to real service account A to a user terminal device. Afterwards, the user sends virtual service account A to an uncertified server by using the terminal device and further completes account linking on the uncertified server. However, if malicious user B keeps attempting linking an account on the uncertified server, the uncertified server returns a predetermined instruction to a terminal device of malicious user B based on a linking request of malicious user B. The predetermined instruction includes a signed license certificate obtained after the uncertified server signs a pre-stored license certificate of the certified server. Because the predetermined instruction also includes the valid signed license certificate, malicious user B can also successfully access the certified server and send forged service account B to the certified server, attempting to obtain a virtual service account returned by the certified server. In a process of accessing the certified server by malicious B, if service account B forged by malicious user B is consistent with real service account A of user A by coincidence, and a virtual service account returned by the certified server corresponds to the real service account one to one, the virtual service account received by malicious user B is the same as virtual service account A of user A. As such, malicious user B successfully steals real service account A of user A. Further, if malicious user B obtains other information of user A through other means, malicious user B can perform an illegal operation on a personal service of user A based on real service account A of user A, causing loss to user A.

To reduce preceding cases, in this implementation of the present application, after receiving the real service account sent by the terminal device, the certified server can generate the unique virtual service account corresponding to the real service account based on the predetermined generation rule. In other words, a virtual service account corresponds to the real service account and the virtual service account generated by the certified server is different each time. As such, cases that a malicious user keeps attempting linking an account to obtain a real service account of a user can be effectively reduced.

Still in the example above, after user A sends real service account A to the certified server by using the terminal device, the certified server can return virtual service account A corresponding to real service account A to the terminal device. If malicious user B also sends real service account A to the certified server by using the terminal device, the certified server can return virtual service account B that is different from virtual service account A to the terminal device of malicious user B. As such, the certified server returns different virtual service accounts to user A and malicious user B for the same real service account A; therefore, malicious user B cannot know real service account A of user A, thereby effectively improving security of the real service account of the user.

It is worthwhile to note that, the certified server can generate the virtual service account corresponding to the real service account by using different generation rules, for example, generate the virtual service account based on time and the real service account, or generate the virtual service account based on a terminal device parameter and the real service account. Therefore, this implementation of the present application imposes no limitation on a generation rule for generating the virtual service account, provided that the virtual service account corresponds to the real service account and the virtual service account generated by the certified server is different each time.

S105: The uncertified server receives the virtual service account sent by the terminal device.

Because the uncertified server does not have the qualification for operating the specific service, the uncertified server cannot store the real service account of the user used for service processing. In this implementation of the present application, the uncertified server can locally store the virtual service account corresponding to the real service account of the user used for service processing, so the uncertified server can provide the account linking function for the user. The virtual service account is not real and is used to establish a mapping relationship with the real service account stored in the certified server. As such, based on the virtual service account, the uncertified server can enable the user to quickly complete the service processing work in the subsequent process. Therefore, the uncertified server needs to receive the virtual service account that is sent by the terminal device and that is used for account linking, and further link the virtual service account to the user account that is registered by the user with the uncertified server in subsequent step S106.

It is worthwhile to note that, in addition to a service account used for service processing, the user further needs to send information such as a user name, a user phone number, address information, an email address, and a photo to the server during account linking, so such information can be used to verify the service account stored in a server or recover or reset the service account in the server in the subsequent process. In other words, the information is used to protect the service account to some extent. Therefore, in this implementation of the present application, in addition to the virtual service account returned by the certified server, the terminal device can further return information used to protect the virtual service account to the uncertified server. The information includes but is not limited to at least one of a user name, a user identity card number, a user mobile phone number, user address information, a user photo, a user email address, a short message-based verification code, and an email-based verification code.

S106: The uncertified server links the virtual service account to the user account.

This implementation of the present application intends to enable the uncertified server that does not have the qualification for operating the specific service to provide the user with the account linking service. Therefore, when receiving the virtual service account sent by the user terminal device, the uncertified server can determine the user account used by the terminal device to send the virtual service account, and further link the user account to the received virtual service account and store the virtual service account. As such, when the user performs service processing on the uncertified server subsequently, the uncertified server can call the virtual service account in a linking relationship with the user account based on the determined user account, establish a connection with the certified server based on the virtual service account, and eventually complete the service processing work on the certified server.

It can be seen from the previously described method that, the uncertified server can store the virtual service account that is generated by the certified server and that corresponds to the real service account. Therefore, in the subsequent process, the uncertified server can establish a service connection with the certified server based on the mapping relationship between the virtual service account and the real service account. In other words, when the uncertified server performs service processing, the certified server can assist the uncertified server in completing the service processing work. As such, even if the uncertified server does not have the qualification for operating the specific service, the uncertified server can provide the user with the account linking function, so the user does not need to enter the real service account used for service processing each time during subsequent service processing, thereby greatly reducing the complexity of service processing for the user and bringing convenience to the user.

In addition, in step S104 above, after generating the unique virtual service account corresponding to the received real service account, the certified server can directly send the virtual service account to the uncertified server, so the uncertified server can link the virtual service account to the user account currently used by the user to log in to the uncertified server, to complete the entire account linking process.

After completing account linking on the uncertified server, the user can quickly complete the service processing work on the uncertified server based on the account linking. Therefore, the following describes in detail the service processing process of the user on the uncertified server for clearer and more comprehensible illustration.

Figure 2:
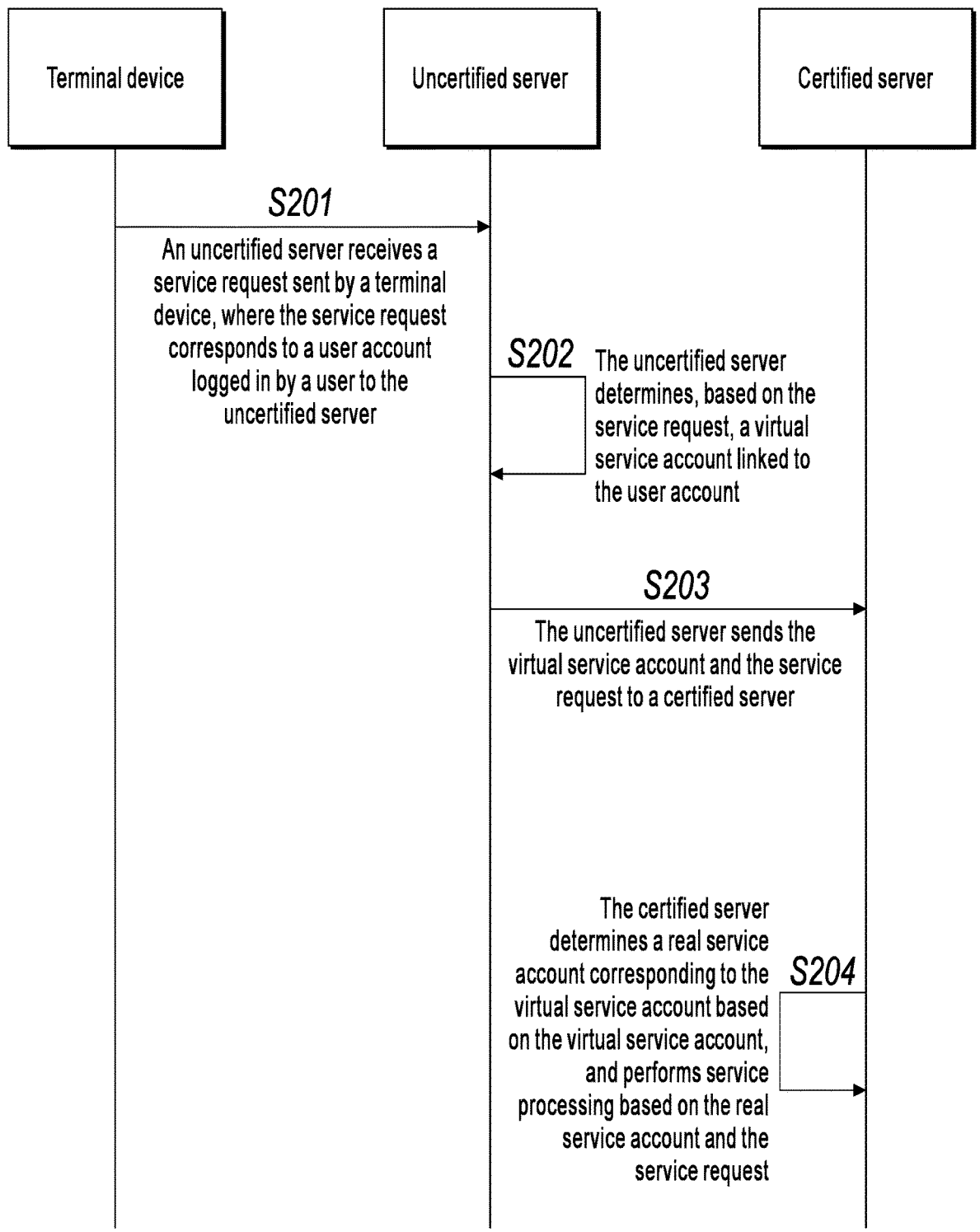
FIG. 2 illustrates a service processing process, according to an implementation of the present application.

FIG. 2 illustrates a service processing process, according to an implementation of the present application. The service processing process includes the following steps.

S201: An uncertified server receives a service request sent by a terminal device, where the service request corresponds to a user account logged in by the user to the uncertified server.

In actual applications, during service processing, the user usually needs to first enter the user account registered in advance with the uncertified server into the terminal device, and then log in to the uncertified server. Afterwards, the user can send the service request used for service processing to the uncertified server by using the terminal device. Correspondingly, the uncertified server receives the service request that corresponds to the user account and that is sent by the terminal device, and then completes service processing work based on the service request in subsequent steps S202 to S204.

S202: The uncertified server determines, based on the service request, a virtual service account linked to the user account.

The user performs account linking on the uncertified server in advance. Therefore, after receiving the service request sent by the user terminal device, the uncertified server can first determine a user account used by the user terminal device to send the service request (namely, the user account currently used by the user to log in to the uncertified server), determine a virtual service account linked to the user account based on a pre-stored linking relationship between the user account and the virtual service account, and send the virtual service account to a certified server that has a qualification for operating specific service in subsequent step S203.

S203: The uncertified server sends the virtual service account and the service request to a certified server.

In actual applications, the specific service of the user can be processed by the certified server that has the qualification for operating the specific service instead of the uncertified server that the user currently logs in to. Therefore, after determining, based on the service request sent by the terminal device, the virtual service account that is previously linked by the user on the uncertified server, the uncertified server can send to the certified server the virtual service account and the service request that is sent by the terminal device, so the certified server can eventually complete the service processing work in subsequent step S204.

S204: The certified server determines a real service account corresponding to the virtual service account based on the virtual service account, and performs service processing based on the real service account and the service request.

After receiving the virtual service account and the service request that are sent by the uncertified server, the certified server can determine the real service account corresponding to the virtual service account based on a pre-stored mapping relationship between the virtual service account and the real service account, and process a service corresponding to the service request based on the determined real service account and the received service request. After completing the service processing work, the certified server can return a service processing result to the uncertified server, so the uncertified server displays the service processing result to the user and the user can immediately know the service processing result. As such, the certified server can assist the uncertified server in the service processing work of the user and further provide more convenience for the user during service processing.

It can be seen from the previously described method that, the user can perform account linking for the specific service on the uncertified server. Therefore, during subsequent processing of the specific service, the user can make the uncertified server to establish a service connection to the certified server based on the virtual service account previously linked on the uncertified server, and eventually complete the service processing work by using the certified server. Although the service processing work is substantially not completed by the uncertified server, the uncertified server can provide the user with a service processing entry without needing input of the real service account, so the user can quickly complete the service processing work through the entry, thereby reducing the complexity of service processing for the user and bringing great convenience to the user.

The method above can be applicable to account linking and service processing of a plurality of specific services, for example, air ticket purchase, verification code acquisition by using a mobile phone, and bank card payment. In bank card payment service, a bank card number is of essential importance to a person. Therefore, a security level needed by a payment system (namely, the previously described certified server) that stores the bank card number is very high. For this, a payment system that has a bank card number storage qualification generally needs to be certified by the international Payment Card Industry (PCI). In actual applications, maintenance personnel need to perform massive reconstruction on the payment system so the payment system can be certified by the PCI. As a result, operation cost of the service increase. Due to the burden of cost, some merchant systems (the previously described uncertified server) do not receive corresponding reconstruction on their systems, hardware, etc. As a result, these merchant systems do not have a qualification for operating the service. For the merchant systems to provide the user with a bank card payment service and a bank card linking service, the payment system can output a capability of the bank card payment service to the merchant systems. In other words, the payment system can assist the merchant systems in providing the user with the bank card payment service and the bank card linking service. As such, the merchant systems can provide the user with the bank card payment service without needing a large amount of operation costs. Moreover, the bank card payment service provided by the merchant systems is substantially completed by the payment system. Therefore, the bank card payment service provided by the merchant systems is compliant with proper regulations, and brings convenience to the user during the bank card payment service. The following describes in detail a process of providing account linking for the user by a merchant system for clearer and more comprehensible illustration.

Figure 3:
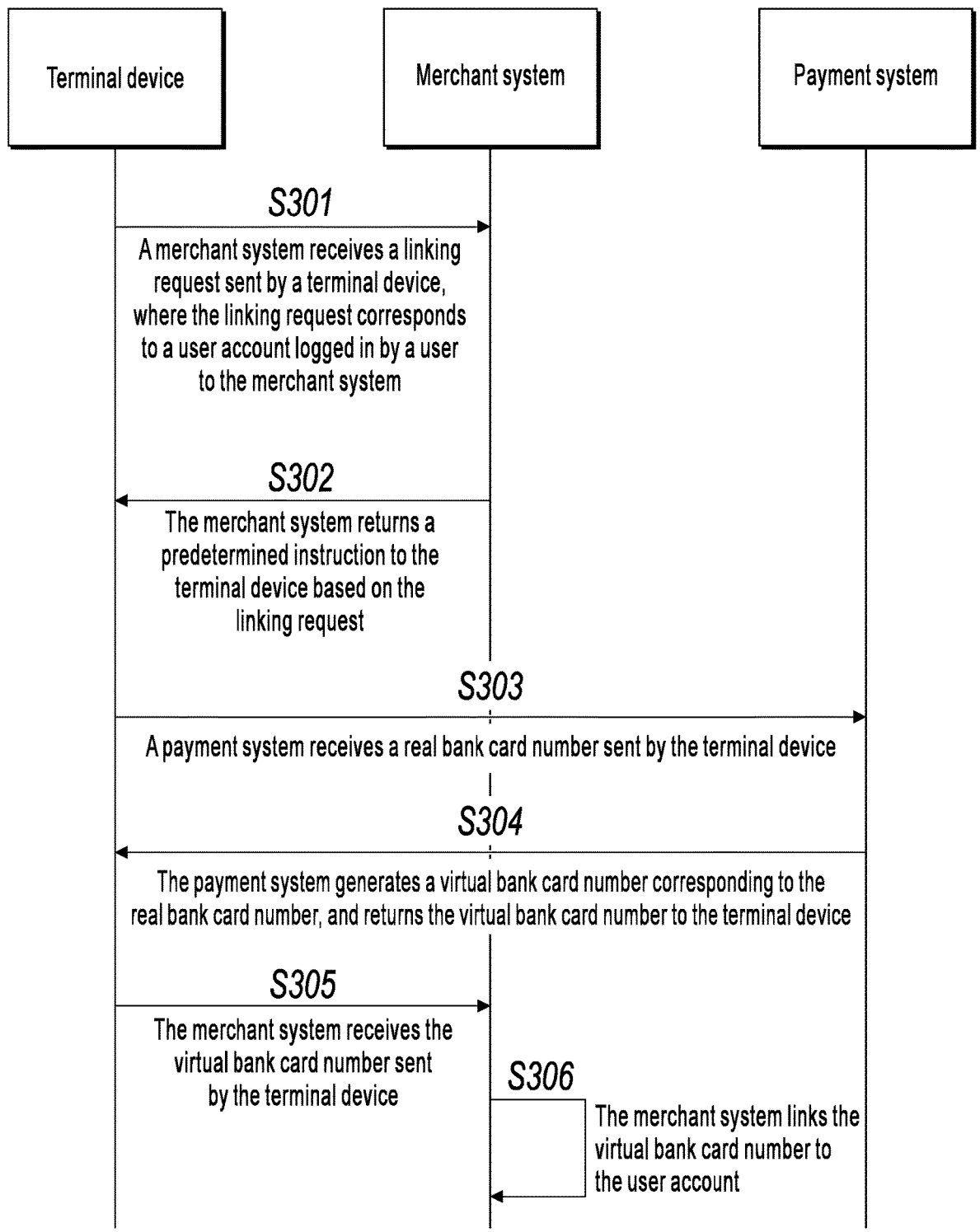
FIG. 3 illustrates an account linking process, according to an implementation of the present application.

FIG. 3 illustrates an account linking process, according to an implementation of the present application. The account linking process includes the following steps.

S301: A merchant system receives a linking request sent by a terminal device, where the linking request corresponds to a user account logged in by a user to the merchant system.

To perform account linking in the merchant system, the user can send the account linking request to the merchant system by using the terminal device. In the process, the user generally needs to log in to the merchant system by using the terminal device and the user account that is previously registered by the user with the merchant system, and then send the account linking request to the merchant system. Correspondingly, the merchant system receives the linking request that corresponds to the user account and that is sent by the terminal device, and completes user account linking work in subsequent steps S302 to S306.

S302: The merchant system returns a predetermined instruction to the terminal device based on the linking request.

After receiving the linking request sent by the user terminal device, the merchant system can sign a locally pre-stored license certificate of the payment system, to obtain a signed license certificate, and then return the predetermined instruction including the signed license certificate to the user terminal device, so the terminal device can access the payment system in subsequent step S303. A detailed process is the same as the process in step S102 in FIG. 1, and details are omitted here for simplicity.

S303: A payment system receives a real bank card number sent by the terminal device.

Because the merchant system does not have a qualification for operating the payment service, the merchant system does not have a permission to store the real bank card number of the user. In actual applications, the user usually completes the payment service based on the real bank card number. Therefore, in this implementation of the present application, to assist the merchant system in completing account linking of the user for the payment service, the payment system needs to receive the real bank card number sent by the user terminal device. Based on the real bank card number, the merchant is able to complete the account linking process. The real bank card number may be a deposit card number, a credit card number, etc. A detailed process of step S303 is the same as the process in step S103 in FIG. 1, and details are omitted here for simplicity.

S304: The payment system generates a virtual bank card number corresponding to the real bank card number, and returns the virtual bank card number to the terminal device.

To prevent a malicious user from stealing the real bank card number of the user through a malicious account linking attempt, the payment system can generate a unique virtual bank card number corresponding to the real bank card number based on a predetermined generation rule after receiving the sent real bank card number. A virtual bank card number corresponds to the real bank card number and the virtual bank card number generated by the payment system is different each time. A detailed process is the same as the process in step S104 in FIG. 1, and details are omitted here for simplicity.

S305: The merchant system receives the virtual bank card number sent by the terminal device.

This implementation of the present application intends to enable the merchant system that does not have payment service operation to provide the user with an account linking function for the payment service. Therefore, the merchant system can receive the virtual bank card number sent by the terminal device. The virtual bank card number is generated by the payment system for the real bank card number sent by the terminal device. Then, the merchant system can link the virtual bank card number to the user account in subsequent step S306.

S306: The merchant system links the virtual bank card number to the user account.

After receiving the virtual bank card number sent by the user terminal device, the merchant system can determine a user account used by the virtual bank card number, and further link the user account to the virtual bank card number.

As such, when the user subsequently handles payment service processing work in the merchant system, the merchant system can call the virtual bank card number in the linking relationship with the user account based on the determined user account, establish a connection to the payment system by using the virtual bank card number, and eventually complete the payment service processing work in the payment system.

It can be seen from the previously described method that, the merchant system can store the virtual bank card number that corresponds to the real bank card number and that is generated by the payment system. Therefore, in a subsequent process, the merchant system can establish a service connection to the payment system based on a mapping relationship between the virtual bank card number and the real bank card number. In other words, when the merchant system processes the payment service, the payment system can assist the merchant system in completing the payment service processing work. As such, even if the merchant system does not have the qualification for operating the payment service, the merchant system can provide the user with the account linking function for the payment service, so the user does not need to enter the real service account used for payment service processing each time during subsequent payment service processing, thereby greatly reducing the complexity of payment service processing for the user and bringing convenience to the user.

In addition, in step S304 above, after generating the unique virtual bank card number corresponding to the received real bank card number, the payment system can directly send the virtual bank card number to the merchant system, so the merchant system can link the virtual bank card number to the user account currently used by the user to log in to the merchant system, to complete the entire account linking process.

After completing account linking in the merchant system, the user can quickly complete the payment service processing work in the merchant system based on the account linking. Therefore, the following describes in detail the payment service processing process of the user in the merchant system for clearer and more comprehensible illustration.

Figure 4:
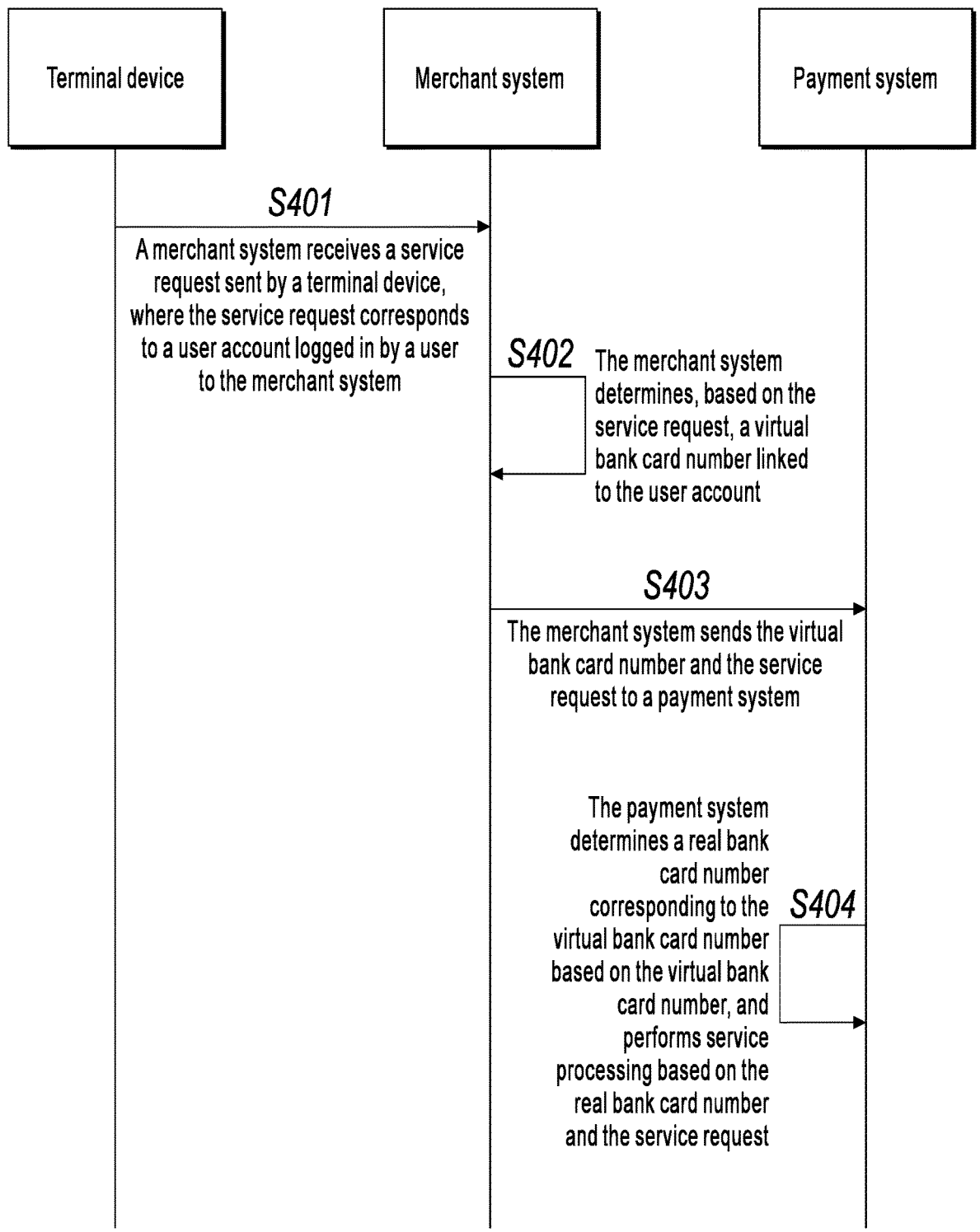
FIG. 4 illustrates a service processing process, according to an implementation of the present application.

FIG. 4 illustrates a service processing process, according to an implementation of the present application. The service processing process includes the following steps.

S401: A merchant system receives a service request sent by a terminal device, where the service request corresponds to a user account logged in by a user to the merchant system.

In actual applications, during payment service processing, the user usually needs to first enter the user account registered in advance with the merchant system into the terminal device, and then log in to the merchant system. Afterwards, the user can send the service request used for payment service processing to the merchant system by using the terminal device. Correspondingly, the merchant system receives the service request that corresponds to the user account and that is sent by the terminal device, and then completes payment service processing work based on the service request in subsequent steps S402 to S404.

S402: The merchant system determines, based on the service request, a virtual bank card number linked to the user account.

The user performs account linking in the merchant system in advance. Therefore, after receiving the service request sent by the user terminal device, the merchant system can first determine a user account used by the user terminal device to send the service request (namely, the user account currently used by the user to log in to the merchant system), determine a virtual bank card number linked to the user account based on a pre-stored linking relationship between the user account and the virtual bank card number, and send the virtual bank card number to a payment system that has a qualification for operating a payment service in subsequent step S403.

S403: The merchant system sends the virtual bank card number and the service request to a payment system.

In actual applications, the payment service can be processed by the payment system that has the qualification for operating the payment service instead of the merchant system that the user currently logs in to. Therefore, after determining, based on the service request sent by the terminal device, the virtual bank card number that is previously linked by the user in the merchant system, the merchant system can send to the payment system the virtual bank card number and the service request that is sent by the terminal device, so the payment system can eventually complete the payment service processing work in subsequent step S404.

S404: The payment system determines a real bank card number corresponding to the virtual bank card number based on the virtual bank card number, and performs service processing based on the real bank card number and the service request.

After receiving the virtual bank card number and the service request that are sent by the merchant system, the payment system can determine the real bank card number corresponding to the virtual bank card number based on a pre-stored mapping relationship between the virtual bank card number and the real bank card number, and process the payment service corresponding to the service request based on the determined real bank card number and the received service request. After completing the payment service processing work, the payment system can return a payment service processing result to the merchant system, so the merchant system displays the payment service processing result to the user and the user can immediately know the payment service processing result. As such, the payment system can assist the merchant system in the payment service processing work of the user and further provide more convenience for the user during payment service processing.

It can be seen from the previously described method that, the user can perform account linking for the payment service in the merchant system. Therefore, during subsequent processing of the payment service, the user can make the merchant system to establish a service connection to the payment system based on the virtual bank card number previously linked in the merchant system, and eventually complete the payment service processing work by using the payment system. Although the payment service processing work is substantially not completed by the merchant system, the merchant system can provide the user with a payment service processing entry without needing input of the real bank card number. As such, the user can quickly complete the payment service processing work through the entry, thereby reducing the complexity of payment service processing for the user and bringing great convenience to the user.

The content above describes the methods for linking to an account and providing service processing provided in the implementations of the present application. Based on the same idea, implementations of the present application further provide devices for linking to an account and providing service processing, as shown in FIG. 5, FIG. 6, FIG. 7, FIG. 8, FIG. 9, FIG. 10, FIG. 11, and FIG. 12.

Figure 5:
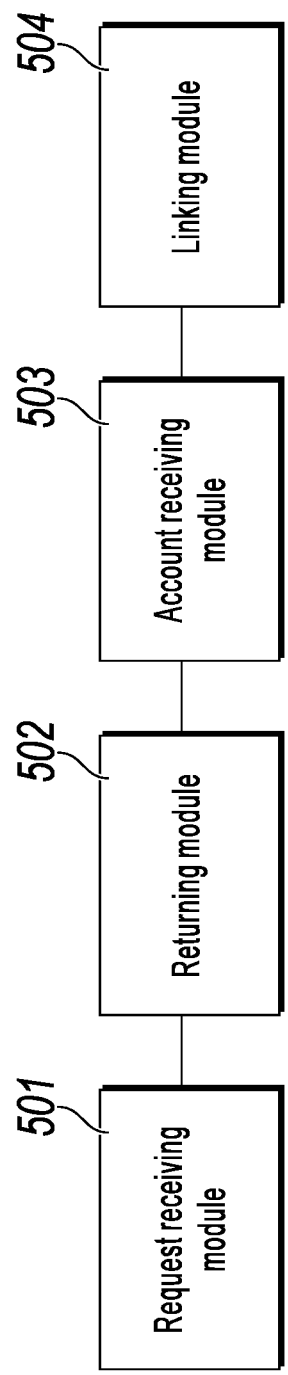
FIG. 5 is a schematic structural diagram illustrating a device for linking to an account, according to an implementation of the present application.

FIG. 5 is a schematic structural diagram illustrating a device for linking to an account, according to an implementation of the present application. The device includes the following: a request receiving module 501, configured to receive a linking request sent by a terminal device, where the linking request corresponds to a user account logged in by a user to the device; a returning module 502, configured to return a predetermined instruction to the terminal device based on the linking request, so the terminal device sends a real service account to a certified server based on the predetermined instruction, and further the certified server generates a virtual service account corresponding to the real service account and returns the virtual service account to the terminal device; an account receiving module 503, configured to receive the virtual service account sent by the terminal device; and a linking module 504, configured to link the virtual service account to the user account.

The returning module 502 is configured to sign a pre-stored license certificate of the certified server based on the license certificate, to obtain a signed license certificate; and return the predetermined instruction including the signed license certificate to the terminal device, so the terminal device sends the signed license certificate and the real service account to the certified server. Then the certified server generates the virtual service account corresponding to the real service account after successfully performing verification on the signed license certificate, and returns the virtual service account to the terminal device.

Figure 6:
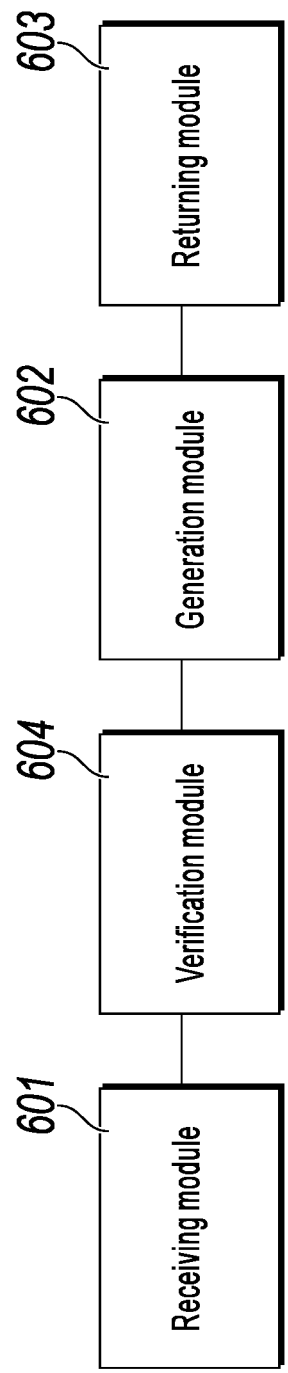
FIG. 6 is a schematic structural diagram illustrating a device for linking to an account, according to an implementation of the present application.

FIG. 6 is a schematic structural diagram illustrating a device for linking to an account, according to an implementation of the present application. The device includes the following: a receiving module 601, configured to receive a real service account sent by a terminal device, where the real service account is sent by the terminal device to the device based on a predetermined instruction that is sent by an uncertified server to the terminal device, the predetermined instruction is returned by the uncertified server to the terminal device after receiving a linking request sent by the terminal device, and the linking request corresponds to a user account logged in by a user to the uncertified server; a generation module 602, configured to generate a virtual service account corresponding to the real service account; and a returning module 603, configured to return the virtual service account to the terminal device, so the terminal device sends the virtual service account to the uncertified server after receiving the virtual service account, and further the uncertified server links the virtual service account to the user account.

The generation module 602 is configured to generate a unique virtual service account corresponding to the real service account based on a predetermined generation rule, where a virtual service account corresponds to the real service account and the virtual service account generated by the device is different each time.

The receiving module 601 is configured to receive the real service account and a signed license certificate that are sent by the terminal device, where the signed license certificated is included in the predetermined instruction and sent by the uncertified server to the terminal device.

The device further includes the following: a verification module 604, configured to perform verification on the signed license certificate before the generation module 602 generates the virtual service account corresponding to the real service account; and determine that the verification succeeds.

Figure 7:
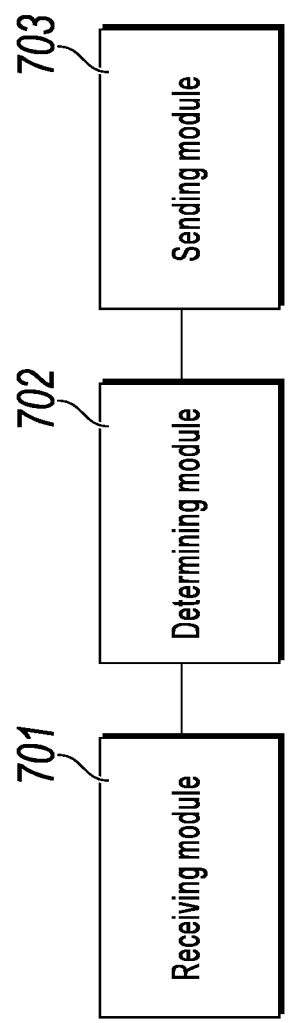
FIG. 7 is a schematic structural diagram illustrating a device for providing service processing, according to an implementation of the present application.

FIG. 7 is a schematic structural diagram illustrating a device for providing service processing, according to an implementation of the present application. The device includes the following: a receiving module 701, configured to receive a service request sent by a terminal device, where the service request corresponds to a user account logged in by a user to the device; a determining module 702, configured to determine, based on the service request, a virtual service account linked to the user account; and a sending module 703, configured to send the virtual service account and the service request to a certified server, so the certified server determines a pre-stored real service account corresponding to the virtual service account based on the virtual service account, and further the certified server performs service processing based on the real service account and the service request.

Figure 8:
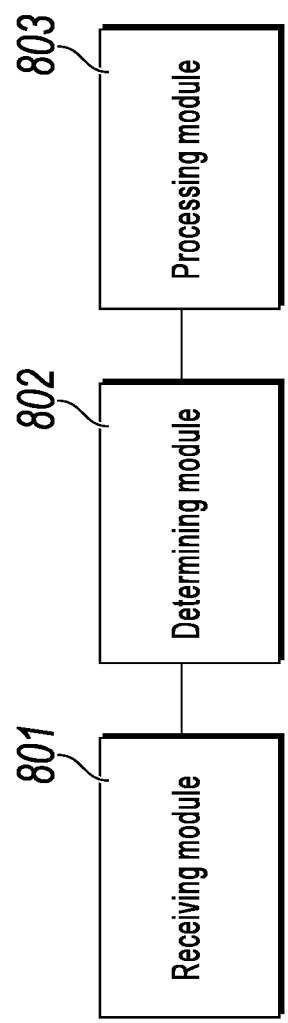
FIG. 8 is a schematic structural diagram illustrating a device for providing service processing, according to an implementation of the present application.

FIG. 8 is a schematic structural diagram illustrating a device for providing service processing, according to an implementation of the present application. The device includes the following: a receiving module 801, configured to receive a virtual service account and a service request that are sent by an uncertified server, where the service request is sent by a terminal device to the uncertified server, the service request corresponds to a user account logged in by a user to the uncertified server, and the virtual service account is a virtual service account that is linked to the user account and that is determined by the uncertified server based on the service request; a determining module 802, configured to determine a real service account corresponding to the virtual service account based on the virtual service account; and a processing module 803, configured to perform service processing based on the real service account and the service request.

Figure 9:
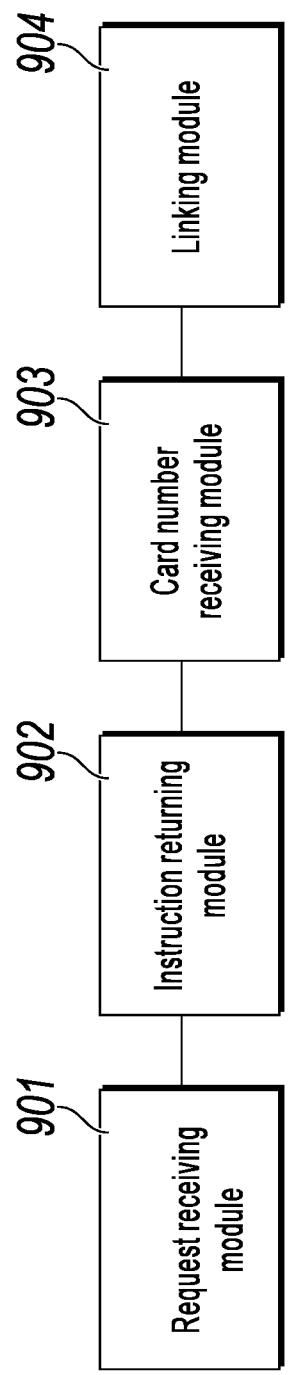
FIG. 9 is a schematic structural diagram illustrating a device for linking to an account, according to an implementation of the present application.

FIG. 9 is a schematic structural diagram illustrating a device for linking to an account, according to an implementation of the present application. The device includes the following: a request receiving module 901, configured to receive a linking request sent by a terminal device, where the linking request corresponds to a user account logged in by a user to the device; an instruction returning module 902, configured to return a predetermined instruction to the terminal device based on the linking request, so the terminal device sends a real bank card number to a payment system based on the predetermined instruction, and further the payment system generates a virtual bank card number corresponding to the real bank card number and returns the virtual bank card number to the terminal device; a card number receiving module 903, configured to receive the virtual bank card number sent by the terminal device; and a linking module 904, configured to link the virtual bank card number to the user account.

Figure 10:
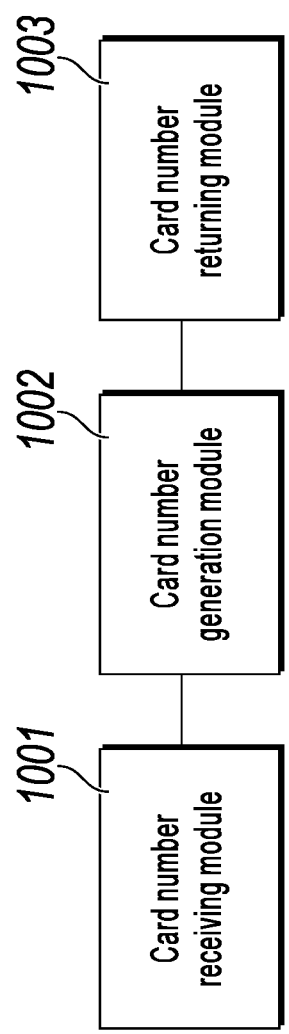
FIG. 10 is a schematic structural diagram illustrating a device for linking to an account, according to an implementation of the present application.

FIG. 10 is a schematic structural diagram illustrating a device for linking to an account, according to an implementation of the present application. The device includes the following: a card number receiving module 1001, configured to receive a real bank card number sent by a terminal device, where the real bank card number is sent by the terminal device to the device based on a predetermined instruction that is sent by a merchant system to the terminal device, the predetermined instruction is returned by the merchant system to the terminal device after receiving a linking request sent by the terminal device, and the linking request corresponds to a user account logged in by a user to the merchant system; a card number generation module 1002, configured to generate a virtual bank card number corresponding to the real bank card number; and a card number returning module 1003, configured to return the virtual bank card number to the terminal device, so the terminal device sends the virtual bank card number to the merchant system after receiving the virtual bank card number, and further the merchant system links the virtual bank card number to the user account.

The card number generation module 1002 is configured to generate a unique virtual bank card number corresponding to the real bank card number based on a predetermined generation rule, where a virtual bank card number corresponds to the real bank card number and the virtual bank card number generated by the device is different each time.

Figure 11:
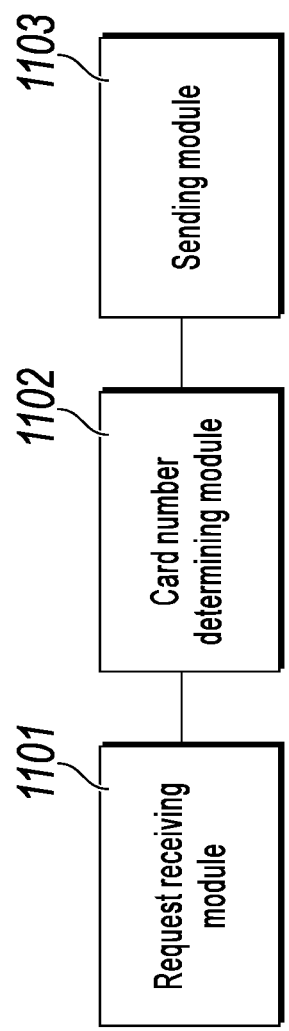
FIG. 11 is a schematic structural diagram illustrating a device for providing service processing, according to an implementation of the present application.

FIG. 11 is a schematic structural diagram illustrating a device for providing service processing, according to an implementation of the present application. The device includes the following: a request receiving module 1101, configured to receive a service request sent by a terminal device, where the service request corresponds to a user account logged in by a user to the device; a card number determining module 1102, configured to determine, based on the service request, a virtual bank card number linked to the user account; and a sending module 1103, configured to send the virtual bank card number and the service request to a payment system, so the payment system determines a pre-stored real bank card number corresponding to the virtual bank card number based on the virtual bank card number, and further the payment system performs service processing based on the real bank card number and the service request.

Figure 12:
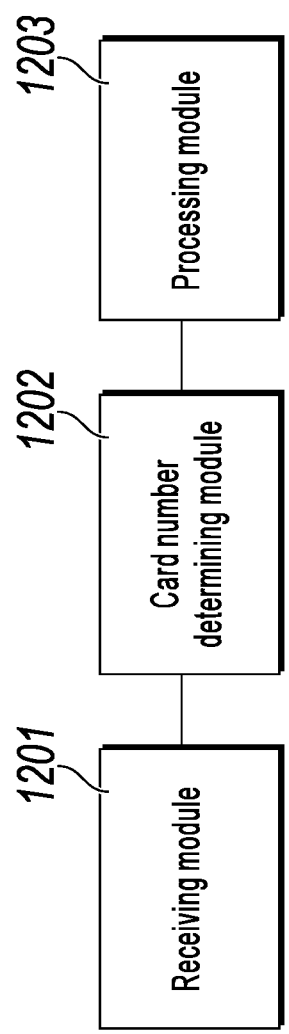
FIG. 12 is a schematic structural diagram illustrating a device for providing service processing, according to an implementation of the present application.

FIG. 12 is a schematic structural diagram illustrating a device for providing service processing, according to an implementation of the present application. The device includes the following: a receiving module 1201, configured to receive a virtual bank card number and a service request that are sent by a merchant system, where the service request is sent by a terminal device to the merchant system, the service request corresponds to a user account logged in by a user to the merchant system, and the virtual bank card number is a virtual bank card number that is linked to the user account and that is determined by the merchant system based on the service request; a card number determining module 1202, configured to determine a real bank card number corresponding to the virtual bank card number based on the virtual bank card number; and a processing module 1203, configured to perform service processing based on the real bank card number and the service request.

Implementations of the present application provide a method and a device for linking to an account and providing service processing. In the method, after receiving a linking request sent by a user terminal device, an uncertified server can return to the terminal device a predetermined instruction that enables the terminal device to access a certified server. Based on the predetermined instruction, the terminal device can send a real service account of a user used for service processing, so the certified server can generate a virtual service account corresponding to the real service account, and return the virtual service account to the user terminal device. After receiving the virtual service account sent by the user terminal device, the uncertified server can link the virtual service account to a user account that is registered by the user with the uncertified server. It can be seen from the previously described method that, the uncertified server links the virtual service account to the user account. As such, after receiving a service request from the user subsequently, the uncertified server can call the virtual service account based on the linking relationship and send the virtual service account to the certified server. Then, the certified server can use the real service account to eventually complete service processing based on a mapping relationship between the virtual service account and the real service account. In other words, the certified server that has a qualification for operating a specific service can output a service processing capability to the uncertified server that does not have the qualification for operating the specific service. Therefore, when performing service processing on the uncertified server, the user does not need to enter the real service account used for service processing each time, thereby reducing the complexity of service processing for the user and bringing convenience to the user during service processing.

In a typical configuration, a computer device includes one or more processors (CPU), an input/output interface, a network interface, and a memory.

The memory may include a non-persistent memory, a random access memory (RAM), a non-volatile memory, and/or another form that are/is in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. According to the definition in this specification, the computer readable medium does not include transitory computer readable media (transitory media), such as a modulated data signal and a carrier.

It is worthwhile to note that, the terms "include", "comprise", or their any other variant is intended to cover a non-exclusive inclusion, so that a process, a method, a commodity, or a device that includes a list of elements not only includes those elements but also includes other elements which are not expressly listed, or further includes elements inherent to such process, method, commodity, or device. An element preceded by "includes a . . . " does not, without more constraints, preclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

Figure 13:
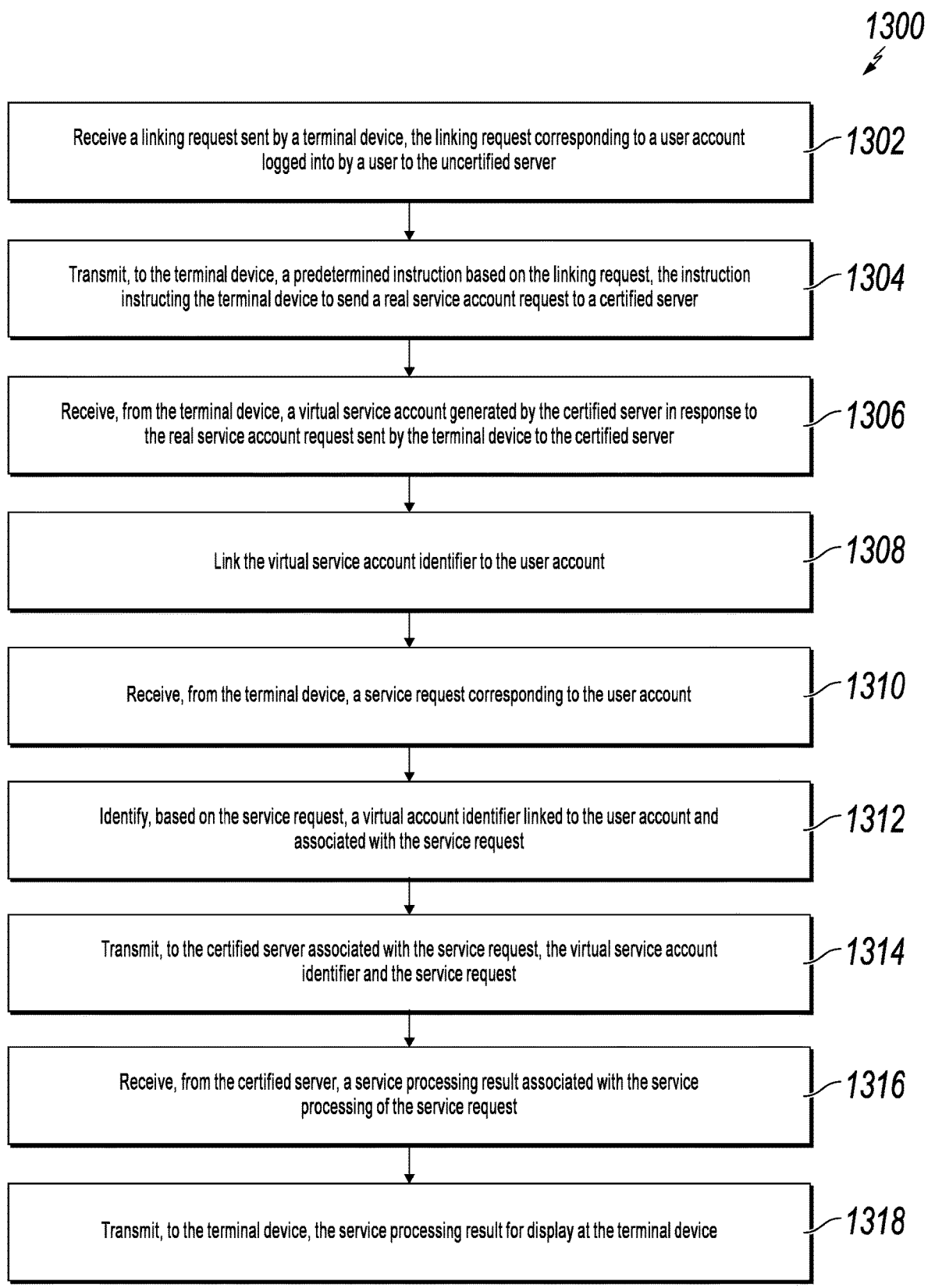
FIG. 13 is a flowchart illustrating an example of a computer-implemented method for an account linking process and a service processing process from the perspective of an uncertified server, according to an implementation of the present disclosure.

The descriptions above are merely implementations of the present application, but are not intended to limit the present application. A person of ordinary skill in the art can understand that the present application can have various changes and modifications. Any modification, equivalent replace- FIG. 13 is a flowchart illustrating an example of a computer-implemented method 1300 for an account linking process and a service processing process from the perspective of an uncertified server, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

At 1302, a linking request can be received by an uncertified server from a terminal device. The linking request can further correspond to a user account logging in by a particular user to the uncertified server. In some implementations, the uncertified server may be a server that does not have the qualification to operate a specific service. Instead of providing the service itself, the uncertified service can provide an account linking function or operation for the specific service, so that users registered and logged into the uncertified server can perform and allow service processing work to be completed via a certified server. When the user needs to perform account linking on the uncertified server for a specific service, the user can first log in to the uncertified server by using the terminal device and the user account that is registered with the uncertified server in advance, and can send a linking request to the uncertified server.

At 1304, the uncertified server can transmit, to the terminal server, a predetermined instruction based on the received linking request. The predetermined instruction can instruct or direct the terminal device to send a real service account request to the certified server corresponding to the linking request. In some instances, after receiving the linking request, the uncertified server can digitally sign a pre-stored license certificate of a certified server to create a signed license certificate. The signing can be performed using a public key or other suitable mechanism, and can be understood, when analyzed by the certified server, to have originated from the uncertified server. The signed license certificate can then be included in the predetermined instruction, and can allow the certified server to verify that the incoming real service account request was initiated by the uncertified server. The license certificate is a license certificate authorized by the certified server to the uncertified server before the uncertified server provides the user with the account linking function. In other words, the certified server authorizes the uncertified server to perform service interaction with the certified server. Because the uncertified server does not have the qualification for operating the specific service, the uncertified server cannot store a real service account of the user used for service processing. For the uncertified server to provide the user with the account linking function for the specific service, the certified server (namely, the server that has the qualification for operating the specific service) needs to assist the uncertified server in completing account linking work for the specific service. The certified server generally first sends a license certificate to the uncertified server that is allowed to perform service interaction with the certified server. As such, when the uncertified server performs service interaction with the certified server subsequently, the certified server can determine whether access here by the terminal device to the certified server is valid based on the signed license certificate that is sent by the terminal device and that is obtained after the uncertified server signs the license certificate. In some instances, the predetermined instruction returned by the uncertified server to the terminal device can further include a port number, some call instructions, etc. of the certified server, so the terminal device can complete the access to the certified server and various operations in a subsequent process based on the port number and call instructions. From 1304, method 1300 continues to 1306.

At 1306, a virtual service account identifier associated with the real service account is received from the terminal device. The virtual service account identifier can be generated by the certified server in response to the real service account request sent by the terminal device to the certified server. The virtual service account identifier can represent, in some instances, a unique virtual service account identifier that corresponds to the real service account to which it relates. In other words, the virtual service account identifier can be used as a replacement for the actual real account number, and allows the uncertified server to communicate with the certified server without sharing the actual values and information associated with the real account. A virtual service account identifier corresponds to the real service account and the virtual service account identifier generated by the certified server can be different each time. For example, entropy may be added to the virtual identifier generation process to ensure randomness in the generation, making it difficult to impossible to maliciously attempt to perform account linking and steal the real service account of the user. In some instances, the certified server can generate the unique virtual service account corresponding to the real service account based on a predetermined generation rule. As such, cases that a malicious user keeps attempting linking an account to obtain a real service account of a user can be effectively reduced. In some instances, the certified server can generate the virtual service account corresponding to the real service account by using different generation rules, for example, it can generate the virtual service account based on time and the real service account, or can generate the virtual service account based on a terminal device parameter and the real service account. Therefore, this implementation of the present application imposes no limitation on a generation rule for generating the virtual service account, provided that the virtual service account corresponds to the real service account and the virtual service account identifier generated by the certified server is different each time. From 1306, method 1300 continues at 1308.

At 1308, the virtual service account identifier can be linked to the user account by the uncertified server. Because the uncertified server does not have the qualification for operating the specific service, the uncertified server cannot store the real service account of the user used for service processing. In this implementation of the present application, the uncertified server can locally store the virtual service account identifier corresponding to the real service account of the user used for service processing, so that the uncertified server can provide the account linking function for the user. The virtual service account identifier is not real and is used to establish a mapping relationship with the real service account stored in the certified server. As such, based on the virtual service account, the uncertified server can enable the user to quickly complete the service processing work. Therefore, the uncertified server needs to receive the virtual service account that is sent by the terminal device and that is used for account linking, and further link the virtual service account to the user account that is registered by the user with the uncertified server.

In addition to a service account used for service processing, the user may need to provide such information as a user name, a user phone number, address information, an email address, and a photo to the server during account linking, so such information can be used to verify the service account stored in a server or recover or reset the service account in the server in the subsequent process. In other words, the information is used to protect the service account to some extent. Therefore, in this implementation, in addition to the virtual service account identifier returned by the certified server, the terminal device can further return information used to protect the virtual service account to the uncertified server. The information includes but is not limited to at least one of a user name, a user identity card number, a user mobile phone number, user address information, a user photo, a user email address, a short message-based verification code, and an email-based verification code.

When receiving the virtual service account sent by the user terminal device, the uncertified server can determine the user account used by the terminal device to send the virtual service account identifier to the uncertified serve and can link the user account to the received virtual service account identifier, and subsequently store the virtual service account identifier as associated with the user account. As such, when the user performs service processing on the uncertified server later, the uncertified server can call the virtual service account identifier in a linking relationship with the user account based on the determined user account, establish a connection with the certified server based on the virtual service account identifier, and eventually complete the service processing work on the certified server.

In some instances, the uncertified server can store the virtual service account identifier that is generated by the certified server and that corresponds to the real service account. Therefore, the uncertified server can establish a service connection with the certified server based on the mapping relationship between the virtual service account identifier and the real service account. In other words, when the uncertified server performs service processing, the certified server can assist the uncertified server in completing the service processing work. As such, even if the uncertified server does not have the qualification for operating the specific service, the uncertified server can provide the user with the account linking function, so the user does not need to enter the real service account used for service processing each time during subsequent service processing, thereby greatly reducing the complexity of service processing for the user and bringing convenience to the user.

In some implementations, after generating the unique virtual service account corresponding to the received real service account, the certified server can directly send the virtual service account to the uncertified server, so the uncertified server can link the virtual service account identifier to the user account currently used by the user to log in to the uncertified server, to complete the entire account linking process.

At 1310, a service request corresponding to the user account can be received from the terminal device. The user account can be logged in at the time of the request, or in association with the request. At 1312, based on the service request, the virtual service account identifier linked to the user account can be identified as associated with the service request.

At 1314, the uncertified server can transmit, to the certified server associated with the service request, the virtual service account identifier and the service request. Using that information, the certified server can perform any suitable service processing operations on the service request. In some instances, once the processing is complete, the uncertified server can received a service processing result message associated with the service processing of the service request at 1316. In those instances, at 1318, the uncertified service can then transmit, to the terminal device, the service processing result or an indication of the result for display to a user interface at the terminal device.

At 1318, method 1300 stops.

Figure 14:
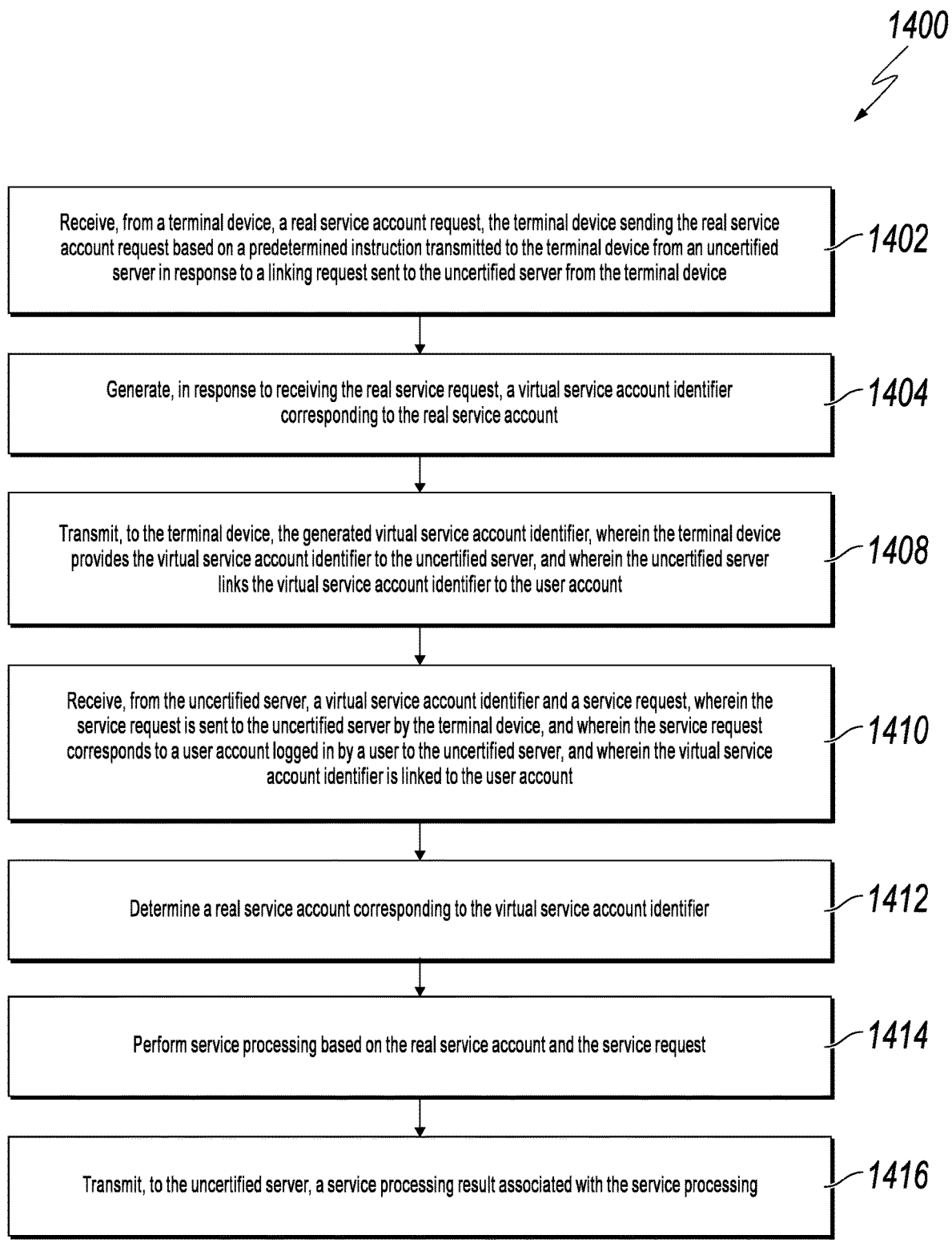
FIG. 14 is a flowchart illustrating an example of a computer-implemented method for an account linking process and a service processing process from the perspective of a certified server, according to an implementation of the present disclosure.

FIG. 14 is a flowchart illustrating an example of a computer-implemented method 1400 for an account linking process and a service processing process from the perspective of a certified server, according to an implementation of the present disclosure. For clarity of presentation, the description that follows generally describes method 140000 in the context of the other figures in this description. In some instances, method 1400 may be directly related to the operations of method 1300, as the two methods relate to the certified and uncertified server operations, respectively. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

At 1402, a real service account request can be received at the certified server from a terminal device. The terminal device may be sending the real service account request to the certified server based on a set of predetermined instructions that were previously transmitted to the terminal device from an uncertified server in response to a linking request that was initially sent to the uncertified server from the terminal device. The linking request can be associated with a user account that is logged in by a user to the uncertified server. The linking request can allow the uncertified server, which could not otherwise perform service processing associated with some service requests, to use the certified server that is able to perform the service via linking of a virtual service account identifier to a user account at the uncertified server, and the virtual service account identifier to a real service account stored at or associated with the certified server.

At 1404, in response to receiving the real service request, a virtual service account identifier corresponding to the real service account can be generated. In some instances, the real service account request may include a digitally signed license certificate, where the certificate is a certificate of the certified server previously provided to the uncertified server. The uncertified server, in response to the linking request, can digitally sign the stored copy of the certificate and include it in the predetermined instruction. When the certified service validates the certificate and the signature as belonging to the uncertified server (e.g., based on public/private key cryptography), then the certified server can perform the generation operation. If the signature is not validated, the operations can end and the linking process can be abandoned, with notifications sent to the appropriate systems. When the virtual service account identifier is generated, it can be linked to the actual real service account for future correspondence and linking. Generating the virtual service account identifier can be performed on any suitable generation rule, and can result in a unique virtual service account identifier. In some instances, the virtual service account identifier generated by the certified server will be different each time the virtual service account identifier is generated, such as by adding entropy or other randomness or pseudo-randomness into the generation process. In some instances, the particular generation algorithm or process may change based on information at the time of the request, or based on system-specific or external entropy information or randomness, as well as a pseudo-random number generator, among others.

At 1408, the generated virtual service account identifier is transmitted to the terminal device by the certified server. In some instances, the virtual service account identifier can be transmitted directly to the uncertified server, as well. The virtual service account identifier can also be relayed to the uncertified server by the terminal device, such that the virtual service account identifier is linked at the uncertified server to the user account associated with the terminal device and logged in at the time of the request. This linking can be used later to allow the uncertified server to provide the service request and virtual service identifier to the certified server when the corresponding service is requested.

At 1410, the certified server can receive, from the uncertified server, a virtual service account identifier and a service request. The service request can be provided to the uncertified server by the terminal device, where the service request corresponds to a particular user account logged into the uncertified server. Based on the linked virtual service account identifier associated with the user account and the service request, the uncertified server can identify the proper certified server to send the service request.

At 1412, the certified server can match the virtual service account identifier received from the uncertified server to the corresponding real service account. Once the real service account is matched and identified, the certified server can perform the service processing based on the identified real service account and the service request at 1414. In some instances, once the service processing is complete, a service processing result associated with the performed service processing can be transmitted to the uncertified server, allowing the uncertified server to provide feedback and additional service processing-related information back to the terminal device for display.

After 1416, method 1400 stops. In some instances, the uncertified system and the certified system may represent, for example, a merchant system as the uncertified system and a payment system as the certified system. The real service account may correspond to a financial account number or payment card number (e.g., a bank card number), and the virtual service account identifier may be a virtual financial account number or virtual payment card number that can be used in lieu of the real service account number. The process described herein can allow the merchant system to safely share the unique virtual account number with the payment system without exposing actual account information. Other systems using sensitive personal or enterprise information can use a similar process to exchange such information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   transmitting, by a certified server to an uncertified server, a license certificate that authorizes the uncertified server to perform service interaction with the certified server;
   receiving, by the uncertified server, a linking request sent by a terminal device, wherein the linking request corresponds to a user account logged in by a user to the uncertified server;
   obtaining, by the uncertified server, a signed license certificate based on signing the license certificate that is authorized by the certified server to the uncertified server;
   transmitting, from the uncertified server to the terminal device, a predetermined instruction including the signed license certificate based on the linking request, wherein the predetermined instruction instructs the terminal device to send a real service account request including the signed license certificate and a real service account to the certified server based on predetermined instruction;
   verifying, by the certified server, the signed license certificate;
   in response to verifying the signed license certificate, generating, by the certified server, a virtual service account identifier for the user based on a terminal device parameter and the real service account or based on a time and the real service account;
   transmitting, by the certified server, the virtual service account identifier to the terminal device;
   receiving, by the uncertified server from the terminal device, the virtual service account identifier generated by the certified server in response to the real service account request sent by the terminal device to the certified server;
   linking, by the uncertified server, the received virtual service account identifier to the user account registered by the user at the uncertified server;
   locally storing, by the uncertified server, a linking relationship between the registered user account and the virtual service account identifier of the user;
   receiving, at the uncertified server from the terminal device, a service request corresponding to the user account;
   identifying, by the uncertified server, the virtual service account identifier linked to the user account based on the locally stored linking relationship between the user account and the virtual service account identifier;
   transmitting, by the uncertified server, the virtual service account identifier and the service request to the certified server associated with the service request;
   determining, by the certified server, the real service account corresponding to the virtual service account identifier;
   performing, by the certified server, service processing based on the real service account and the service request;
   receiving, by the uncertified server, a service processing result associated with the service request from the certified server; and transmitting, by the uncertified server, the service processing result to the terminal device.

2. The computer-implemented method of claim 1, wherein the predetermined instruction includes a port number and call instructions associated with the certified server.

3. The computer-implemented method of claim 1, wherein the virtual service account identifier is a unique virtual service account identifier corresponding to the real service account.

4. The computer-implemented method of claim 1, further comprising:
receiving, by the uncertified server, the service processing result associated with the service processing based on the real service account and the service request performed by certified server; and
transmitting, by the uncertified server, the service processing result for display to the terminal device.

5. The computer-implemented method of claim 1, wherein the uncertified server is a server that does not have qualifications for operating at least one service, and wherein the certified server is a server that has qualification for operating the at least one service.

6. The computer-implemented method of claim 1, wherein the uncertified server is associated with a merchant system, and wherein the certified server is associated with a payment system, wherein the real service account comprises a real bank card number, and wherein the virtual service account identifier comprises a virtual bank card number.

7. A non-transitory, computer-readable medium storing one or more instructions executable by a computer system to perform operations comprising:
transmitting, by a certified server to an uncertified server, a license certificate that authorizes the uncertified server to perform service interaction with the certified server;
receiving, by the uncertified server, a linking request sent by a terminal device, wherein the linking request corresponds to a user account logged in by a user to the uncertified server;
obtaining, by the uncertified server, a signed license certificate based on signing the license certificate that is authorized by the certified server to the uncertified server;
transmitting, from the uncertified server to the terminal device, a predetermined instruction including the signed license certificate based on the linking request, wherein the predetermined instruction instructs the terminal device to send a real service account request including the signed license certificate and a real service account to the certified server based on predetermined instruction;
verifying, by the certified server, the signed license certificate;
in response to verifying the signed license certificate, generating, by the certified server, a virtual service account identifier for the user based on a terminal device parameter and the real service account or based on a time and the real service account;
transmitting, by the certified server, the virtual service account identifier to the terminal device;
receiving, by the uncertified server from the terminal device, the virtual service account identifier generated by the certified server in response to the real service account request sent by the terminal device to the certified server;
linking, by the uncertified server, the received virtual service account identifier to the user account registered by the user at the uncertified server;
locally storing, by the uncertified server, a linking relationship between the registered user account and the virtual service account identifier of the user;
receiving, at the uncertified server from the terminal device, a service request corresponding to the user account;
identifying, by the uncertified server, the virtual service account identifier linked to the user account based on the locally stored linking relationship between the user account and the virtual service account identifier;
transmitting, by the uncertified server, the virtual service account identifier and the service request to the certified server associated with the service request;
determining, by the certified server, the real service account corresponding to the virtual service account identifier;
performing, by the certified server, service processing based on the real service account and the service request;
receiving, by the uncertified server, a service processing result associated with the service request from the certified server; and
transmitting, by the uncertified server, the service processing result to the terminal device.

8. The non-transitory, computer-readable medium of claim 7, wherein the predetermined instruction includes a port number and call instructions associated with the certified server.

9. The non-transitory, computer-readable medium of claim 7, wherein the virtual service account identifier is a unique virtual service account identifier corresponding to the real service account.

10. The non-transitory, computer-readable medium of claim 7, further comprising:
receiving, by the uncertified server, the service processing result associated with the service processing based on the real service account and the service request performed by certified server; and
transmitting, by the uncertified server, the service processing result for display to the terminal device.

11. The non-transitory, computer-readable medium of claim 7, wherein the uncertified server is associated with a merchant system, and wherein the certified server is associated with a payment system, wherein the real service account comprises a real bank card number, and wherein the virtual service account identifier comprises a virtual bank card number.

* * * * *

UNITED STATES PATENT AND TRADEMARK OFFICE
CERTIFICATE OF CORRECTION

PATENT NO. : 11,107,073 B2
APPLICATION NO. : 16/722209
DATED : August 31, 2021
INVENTOR(S) : Jun Yin It is certified that error appears in the above-identified patent and that said Letters Patent is hereby corrected as shown below:

On the Title Page

Item (63) under Related U.S. Application Data, Below "2017." Insert -- (30) Foreign Application Priority Data Mar. 16, 2016 (CN) .......... 201610150066.8 --.

In the Specification

Column 1/Line 4, Below "PROCESS" Insert -- CROSS REFERENCE TO RELATED APPLICATIONS --.

Signed and Sealed this
Twenty-sixth Day of April, 2022

Katherine Kelly Vidal
*Director of the United States Patent and Trademark Office*